US008894361B2

(12) United States Patent
Rodriguez et al.

(10) Patent No.: US 8,894,361 B2
(45) Date of Patent: Nov. 25, 2014

(54) GAS TURBINE COMPRESSOR INLET WITH REDUCED FLOW DISTORTION

(75) Inventors: Jose L. Rodriguez, Lake Mary, FL (US); Joseph L. Evins, Fort Mill, SC (US)

(73) Assignee: Siemens Energy, Inc., Orlando, FL (US)

( * ) Notice: Subject to any disclaimer, the term of this patent is extended or adjusted under 35 U.S.C. 154(b) by 570 days.

(21) Appl. No.: 13/221,109

(22) Filed: Aug. 30, 2011

(65) Prior Publication Data

US 2013/0052003 A1 Feb. 28, 2013

(51) Int. Cl.
*F01D 1/02* (2006.01)
*F02C 7/06* (2006.01)
*F04D 29/54* (2006.01)
*F02C 7/04* (2006.01)

(52) U.S. Cl.
CPC .............. *F04D 29/541* (2013.01); *F02C 7/06* (2013.01); *F02C 7/04* (2013.01)
USPC ...................... 415/160; 415/209.4; 415/210.1

(58) Field of Classification Search
USPC ................ 415/160, 229, 209.3, 208.2, 209.4, 415/210.1
See application file for complete search history.

(56) References Cited

U.S. PATENT DOCUMENTS

| 3,295,827 | A | * | 1/1967 | Chapman et al. | 416/159 |
|---|---|---|---|---|---|
| 4,695,220 | A | | 9/1987 | Dawson | |
| 5,809,772 | A | | 9/1998 | Giffin, III et al. | |
| 2009/0238689 | A1 | * | 9/2009 | Jamil et al. | 415/229 |
| 2010/0092278 | A1 | * | 4/2010 | Major et al. | 415/160 |

* cited by examiner

*Primary Examiner* — Edward Look
*Assistant Examiner* — Maxime Adjagbe

(57) ABSTRACT

A gas turbine engine compressor has a compressor case comprising spaced apart inner and outer walls. An axial rotor is positioned within the outer wall. A bearing structure supports the axial rotor for rotation. A plurality of inlet guide vanes are coupled to the outer wall of the compressor case and radially extend inwardly, wherein each of at least a sub-set of said inlet guide vanes comprises a radial bore. Nested tie rods are received within a respective one of the inlet guide vane radial bores. Each tie rod comprises an outward end attached to the compressor case outer wall and an inward end attached to the compressor case inner wall.

16 Claims, 3 Drawing Sheets

GAS TURBINE COMPRESSOR INLET WITH REDUCED FLOW DISTORTION

FIELD OF THE INVENTION

The present invention relates generally to industrial gas turbine engines, and more particularly to such an engine including tie-members for supporting a rotor to a compressor case outer wall.

BACKGROUND OF THE INVENTION

A conventional combustible gas turbine engine includes a compressor, a combustor, and a turbine. The compressor compresses air that enters an annular inlet. The combustor combines the compressed air with a fuel and ignites the mixture creating combustion products defining a working gas. The working gas travels to the turbine. Within the turbine are a series of rows of stationary vanes and rotating blades. Each pair of rows of vanes and blades is called a stage. Typically, there are four stages in a turbine. The rotating blades are coupled to a shaft and disc assembly. As the working gas expands through the turbine, the working gas causes the blades, and therefore the shaft and disc assembly, to rotate. The rotating shaft extends into and through the compressor upstream of the turbine and combustor.

In a number of industrial gas turbines, a compressor inlet case (CIC) comprises radially-spaced inlet struts, which are attached across inner and outer walls of the CIC, wherein the inner wall supports the rotating shaft extending through the compressor (i.e., rotor). While the inlet struts provide the required structural load bearing, the presence of these inlet struts causes the overall axial length of the compressor to be extended, which increases costs. Further, the inlet struts interfere with the flow of air moving through an upstream section of the compressor, i.e., causes radial and circumferential flow distortions. These air flow distortions impact a first stage of rotating blades in the compressor. Thus, the rotating blades have to be designed to not be susceptible to damage due to any resonant frequency in the design induced by these flow distortions, which can be detrimental to optimum performance of the rotating blade.

SUMMARY OF THE INVENTION

The following presents a summary in order to provide a basic understanding of some aspects of the present invention. This summary is not an extensive overview and is intended to neither identify key or critical elements nor delineate the scope of such aspects.

In accordance with one or more aspects and corresponding disclosure thereof, various aspects are described in connection with a gas turbine engine that replaces an inlet case strut support structure for supporting an axial rotor of an axial compressor with tie-rods located within inlet guide vane (IGV) airfoils. The tie-rods are placed in tension to support a first bearing and a forward end of the axial rotor for all engine operating conditions. Obviating the need for strut support allows for a shorter compressor assembly, for a simplified design requirement for a first stage of rotor blades, and for improved air flow and thus performance of the gas turbine engine.

In one aspect, the present disclosure provides a gas turbine engine compressor having a compressor case comprising spaced apart inner and outer walls. An axial rotor is positioned within the outer wall. A bearing structure supports the axial rotor for rotation. A plurality of inlet guide vanes are coupled to the outer wall of the compressor case and radially extend inwardly, wherein each of at least a sub-set of the inlet guide vanes comprises a radial bore. Tie members are provided, each of which is received within a respective one of the inlet guide vane radial bores. Each tie member comprises an outward end attached to the compressor case outer wall and an inward end attached to the compressor case inner wall.

The tie members may be held in tension between the compressor case inner and outer walls and function to transfer load forces from the compressor case inner wall to the compressor case outer wall.

The bearing structure may be coupled between the compressor case inner wall and the rotor.

Each of the inlet guide vanes may be capable of pivotable movement about a radial axis.

Preferably, a plurality of blades are coupled to the rotor and a plurality of fixed vanes are coupled to the compressor case outer wall.

The bearing structure may comprise a stationary section providing an oil film between the bearing structure and the rotor. Alternatively, the bearing structure may comprise a roller bearing or a journal bearing.

A first number of tie members may be less than a second number of inlet guide vanes. Alternatively, each of the plurality of the inlet guide vanes comprise a radial bore, and wherein a first number of tie members is equal to a second number of inlet guide vanes.

The bearing structure may comprise a first bearing positioned at an inlet end of the axial rotor.

In another aspect, a gas turbine engine comprises a compressor, combustor, and power turbine. The compressor comprises a compressor case comprising spaced apart inner and outer walls. An axial rotor is positioned within the outer wall. A bearing structure supports the axial rotor for rotation. A plurality of inlet guide vanes are coupled to the outer wall of the compressor case and radially extend inwardly, wherein each of at least a sub-set of the inlet guide vanes comprises a radial bore. Tie members are provided, each of which is received within a respective one of the inlet guide vane radial bores. Each tie member comprises an outward end attached to the compressor case outer wall and an inward end attached to the compressor case inner wall.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION OF THE INVENTION

In industrial gas turbine engines comprising a compressor that make use of an inlet case and a compressor case, the present innovation replaces a need for an inlet case strut support structure for supporting an axial rotor by incorporating tie-rods or cables nested within inlet guide vanes (IGV). The tie-rods or cables are placed in tension to support a bearing and forward (inlet) end of the axial rotor for all engine operating conditions. Thereby, additional aerodynamic losses and flow distortion normally associated with inlet case support struts are avoided. The gas turbine engine may further comprise a combustor that receives a working gas from the compressor and a power turbine that receives a working hot gas from the combustor.

A conventional arrangement of five (5) or eight (8) inlet case struts support a first bearing, wherein the struts are about 55-89 mm (2.2-3.5 inches) thick at their widest point. These inlet struts cause aerodynamic losses and flow distortion as the inlet air enters the compressor.

In accordance with the present invention, relatively small diameter tie-rods or cables are introduced within at least a portion or subset of the typically 30-40 inlet guide vanes to provide support for the rotor without impacting an aerodynamic shape of the inlet guide vanes. Thus, a subset or all of the inlet guide vanes containing tie-rods or cables are distributed evenly around the circumference of the compressor case and can handle forces induced by the axial rotor. Hence, a gas turbine engine of the present invention removes the additional aerodynamic losses and distortion caused by the inlet case struts while providing support for the axial rotor via tie members extending through an existing feature of the compressor. The result is reduced aerodynamic losses, reduced inlet flow distortion, increased compressor performance and increased surge margin.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Figure 1:
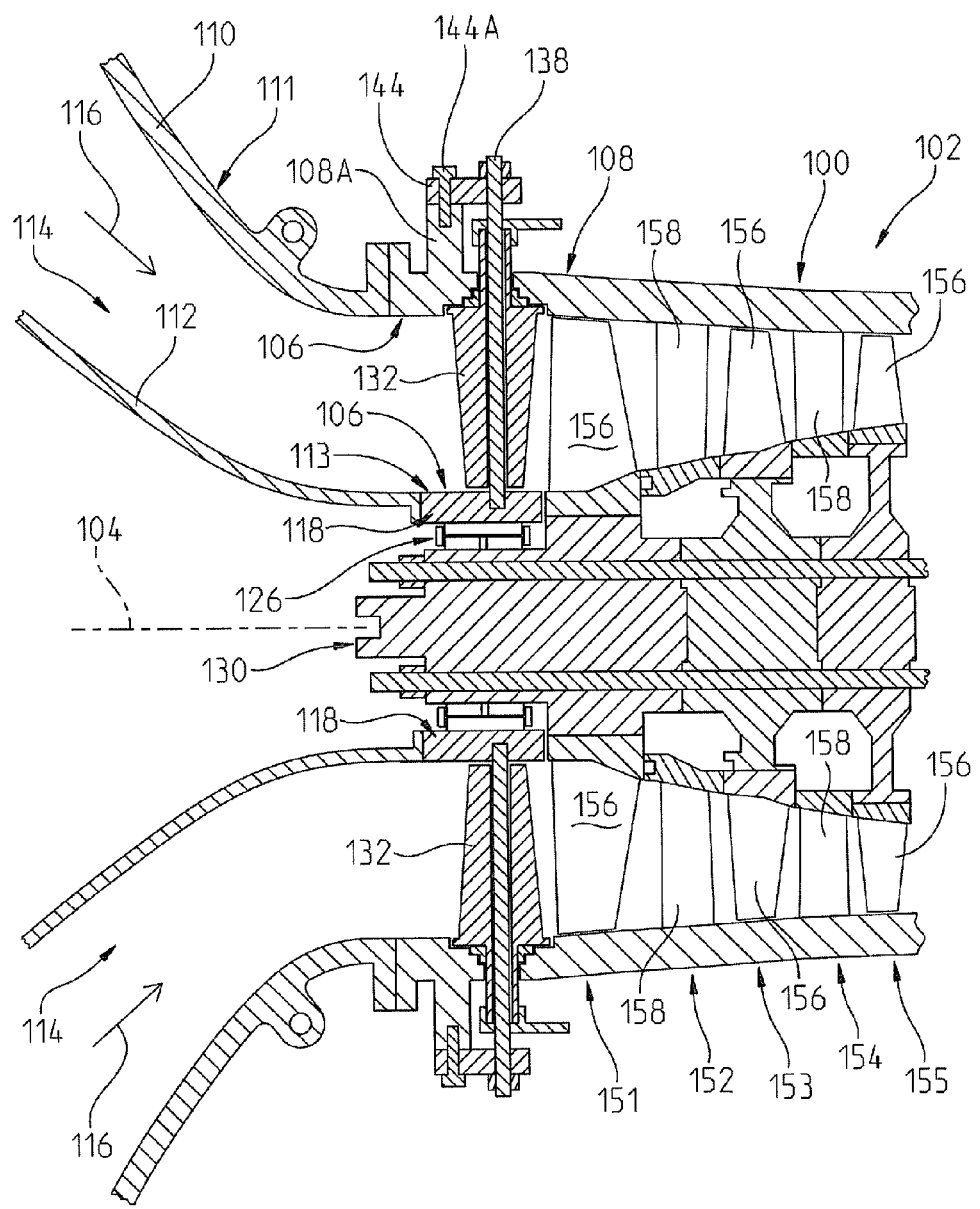
FIG. 1 is a side view of a vertical cross section taken along a longitudinal axis of a first gas turbine engine compressor and through a pair of nested tie-rods passing through radial bores of two inlet guide vane (IGV) airfoils.
Figure 2:
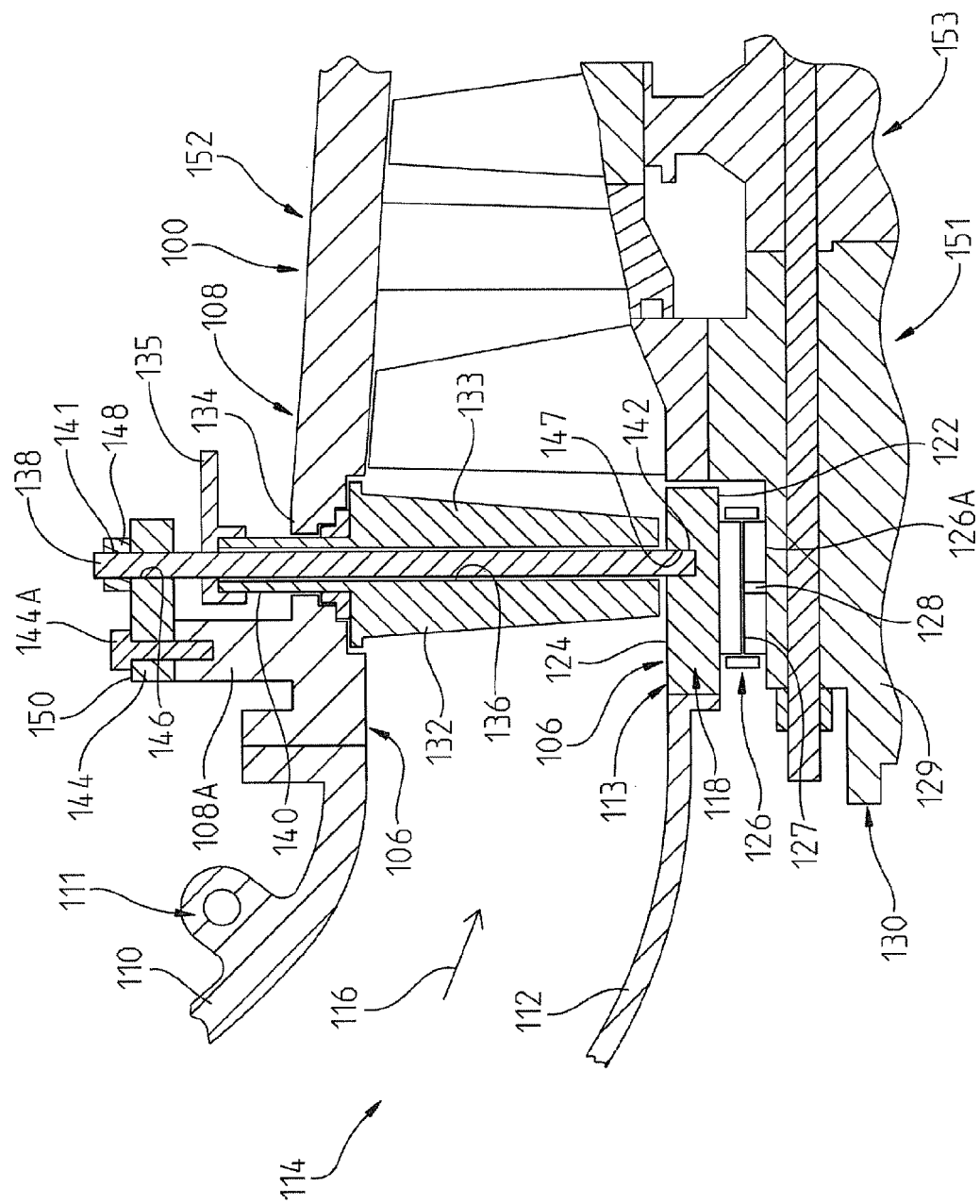
FIG. 2 is a detail side view of one of the IGV airfoils and nested tie-rods of FIG. 1.

In FIGS. 1-2, a gas turbine engine compressor 100 of a gas turbine engine 102 is depicted in a side vertical cross section through a longitudinal axis 104. Thus, it should be appreciated that upper and lower portions of radially symmetrically arranged components are depicted in FIG. 1 with a detail view of the upper portions in FIG. 2. A compressor case 106 has an outer wall 108 that is coupled to a flared outer section 110 of an inlet case 111. A flared inner section 112 of the inlet case 111 is coupled to an inner wall 113 of the compressor case 106. The flared outer and inner sections 110 and 112 of the inlet case 111 are spaced apart from one another and define therebetween an annular inlet 114 for receiving a flow, depicted at 116, of air.

With particular reference to FIG. 2, a bearing support section 118 of the inner wall 113 is positioned downstream from and coupled to the inlet case inner section 112 and defines an inward bearing attachment surface 122 and an outward tie-rod attachment surface 124. The inward bearing attachment surface 122 receives and supports a bearing 126, also referred to herein as a "bearing structure," depicted as a hydrostatic bearing with an inner manifold 127 and a plurality of channels 128 for providing an oil film to an inner surface 126A of the bearing 126. Other bearing types can be used such as a journal bearing or a roller bearing.

The bearing 126 receives a first (inlet) end 129 of an axial rotor 130 that is positioned within the outer wall 108. The bearing 126 is generally aligned with and positioned within a circumferentially extending row of inlet guide vanes 132, each of which is attached for pivotal rotation about a radial axis to a portion 134 of the outer wall 108 of the compressor case 106 and attached downstream of the inlet case 111. The bearing 126 is positioned and coupled between the bearing support section 118 of the compressor case inner wall 113 and the axial rotor 130. Each inlet guide vane 132 comprises an airfoil 133 and an outward end 140 coupled to the airfoil 133 to effect rotation of the airfoil 133, both having a corresponding radial bore, which are radially aligned and together define a radial bore 136 through the inlet guide vane 132. An actuating arm 135, also including a bore aligned with the radial bore 136, extends perpendicularly and is coupled to the outward end 140, which may be moved via conventional linkage structure and a drive mechanism. One known conventional inlet guide vane assembly is disclosed in U.S. Pat. No. 4,695,220, the entire disclosure of which is incorporated herein by reference.

Thus, a plurality of inlet guide vanes 132 are coupled to the outer wall 108 of the compressor case 106 and extend radially inward. Each of a subset or all of the inlet guide vanes 132 can comprise a radial bore 136 that coincides with an axis of pivotal rotation of a corresponding IGV airfoil 133, respectively. At least some or all of the radial bores 136 receive a nested tie-rod 138. The IGV airfoils 133 can pivot about the nested tie-rods 138 in a non-interfering manner.

Each nested tie-rod 138 has an outward end 141 that is attached to the outer wall 108 of the compressor case 106 and an inward end 142 that is attached to the inner wall 113 of the compressor case 106. In particular, an annular mounting bracket 144 forming part of the outer wall 108 and coupled via bolts 144A to a main body portion 108A of the outer wall 108 has a plurality of circumferentially spaced apart bores 146 for receiving the outward ends 141 of the nested tie-rods 138. The inner wall bearing support section 118 includes a plurality of circumferentially spaced apart threaded holes 147, each for receiving a threaded surface of the inward end 142 of a corresponding nested tie-rod 138. A fastener 148, such as a nut, on the outward end 141 of each nested tie-rod 138 engages an outward surface 150 of the mounting bracket 144 so as to hold the nested tie-rod 138 under tension to transfer load forces from the inner wall 113 to the outer wall 108 of the compressor case 106.

It is contemplated that cable sections can be used in place of the tie-rods 138. The term "tie member" encompasses tie-rods, cables and like elements.

With particular reference to FIG. 1, five compressor stages 151-155 are depicted of a plurality of blades 156 coupled to the axial rotor 130 and a plurality of fixed vanes 158 coupled to the outer wall 108 of the compressor case 106.

Figure 3:
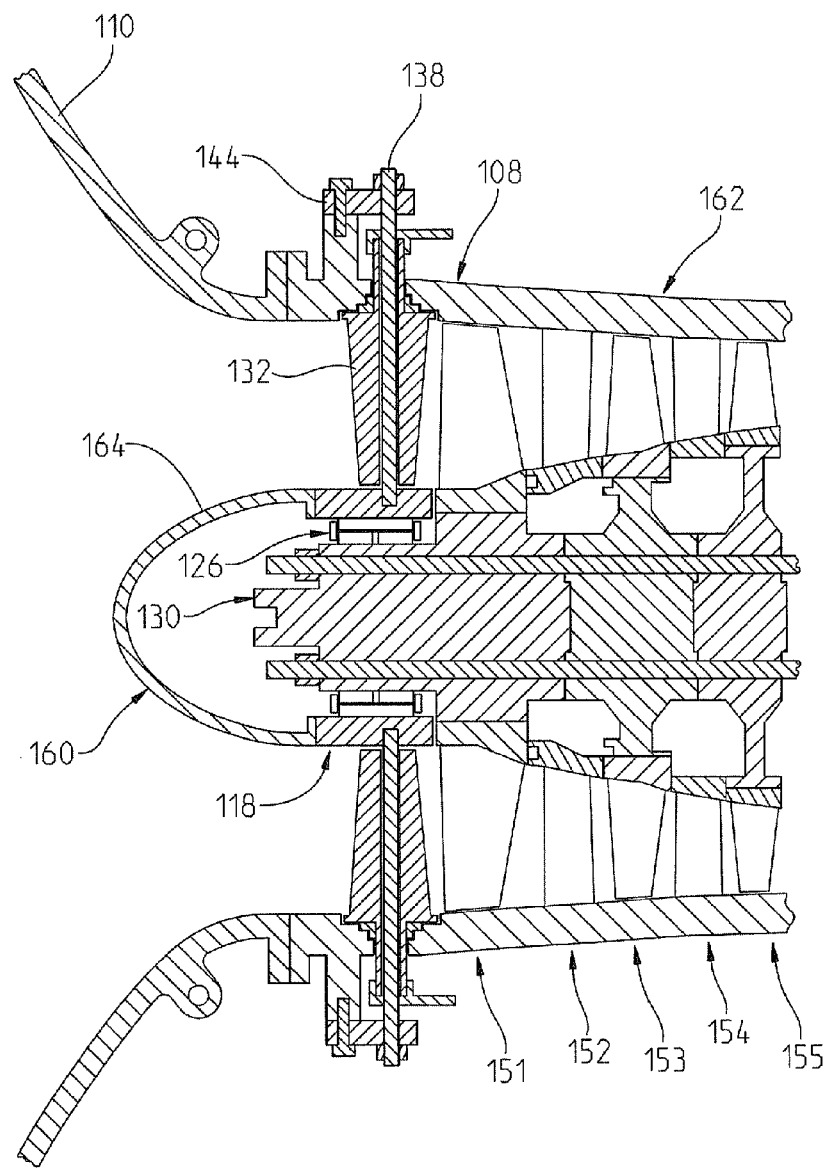
FIG. 3 is a side view of a vertical cross section taken along a longitudinal axis of a second gas turbine engine compressor and through a pair of nested tie-rods passing through radial bores of two IGV airfoils.

In FIG. 3, an alternate inlet case inner wall 160 is depicted for a gas turbine engine compressor 162 that can otherwise be identical to the gas turbine engine compressor 100 (FIGS. 1-2). The alternate inner wall 160 has a nose cone 164 instead of the flared inner wall 112 (FIG. 1-2).

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A gas turbine engine compressor comprising:
   a compressor case comprising spaced apart inner and outer walls;
   an axial rotor positioned within said outer wall;
   a bearing structure for supporting said axial rotor for rotation;
   a plurality of inlet guide vanes coupled to said outer wall of said compressor case and radially extending inwardly, wherein each of at least a sub-set of said inlet guide vanes comprises a radial bore; and
   a plurality of tie members, each of said tie members being received within a respective one of said inlet guide vane radial bores, each said tie member comprising an outward end attached to said compressor case outer wall so as to be non-rotational relative to said compressor case outer wall and an inward end attached to said compressor case inner wall, wherein said tie members are held in tension between said compressor case inner and outer walls and function to transfer load forces from said compressor case inner wall to said compressor case outer wall.

2. The gas turbine compressor of claim 1, wherein said bearing structure is coupled between said compressor case inner wall and said rotor.

3. The gas turbine compressor of claim 1, wherein each of said inlet guide vanes is capable of pivotable movement about a radial axis.

4. The gas turbine compressor of claim 3, further comprising a plurality of blades coupled to said rotor and a plurality of fixed vanes coupled to said compressor case outer wall.

5. The gas turbine compressor of claim 1, wherein said bearing structure comprises a stationary section providing an oil film between said bearing structure and said rotor.

6. The gas turbine compressor of claim 1, wherein said bearing structure comprises one of a roller bearing, a hydrostatic bearing, and a journal bearing.

7. The gas turbine compressor of claim 1, wherein a first number of tie members is less than a second number of inlet guide vanes.

8. The gas turbine compressor of claim 1, wherein each of the plurality of said inlet guide vanes comprise a radial bore, and wherein a first number of tie members is equal to a second number of inlet guide vanes.

9. The gas turbine compressor of claim 1, wherein the bearing structure comprises a first bearing positioned at an inlet end of the axial rotor.

10. A gas turbine engine comprising:
    a compressor comprising:
    a compressor case comprising spaced apart inner and outer walls,
    an axial rotor positioned within said outer wall,
    a bearing structure for supporting said axial rotor for rotation,
    a plurality of inlet guide vanes coupled to said outer wall of said compressor case and radially extending inwardly, wherein each of at least a sub-set of said inlet guide vanes comprises a radial bore, and
    a plurality of tie members, each of said tie members being received within a respective one of said inlet guide vane radial bores, each said tie member comprising an outward end attached to said compressor case outer wall and an inward end attached to said compressor case inner wall, wherein a first number of tie members is less than a second number of inlet guide vanes.

11. The gas turbine engine of claim 10, wherein said tie members are held in tension between said compressor case inner and outer walls and function to transfer load forces from said compressor case inner wall to said compressor case outer wall.

12. The gas turbine engine of claim 10, wherein each of said inlet guide vanes is capable of pivotable movement about a radial axis.

13. The gas turbine engine of claim 12, further comprising a plurality of blades coupled to said rotor and a plurality of fixed vanes coupled to said compressor case outer wall.

14. The gas turbine engine of claim 10, wherein said bearing structure comprises a stationary section providing an oil film between said bearing structure and said rotor.

15. The gas turbine engine of claim 10, further comprising an inlet case having inner and outer flared sections.

16. The gas turbine engine of claim 10, further comprising an inlet case having an inner section comprising a nose cone.

* * * * *